(12) United States Patent
Edler et al.

(10) Patent No.: US 11,365,551 B2
(45) Date of Patent: Jun. 21, 2022

(54) LARGE MANIPULATOR WITH END-HOSE HOLDER

(71) Applicant: Schwing GmbH, St. Stefan im Lavanttal (AT)

(72) Inventors: Jörg Edler, Köflach (AT); Daniel Kriegl, Rosenthal a.d.K (AT); Stefan Hörhan, Ehrenhausen (AT)

(73) Assignee: SCHWING GMBH, St. Stefan im Lavanttal (AT)

( * ) Notice: Subject to any disclaimer, the term of this patent is extended or adjusted under 35 U.S.C. 154(b) by 0 days.

(21) Appl. No.: 16/964,040

(22) PCT Filed: Jan. 23, 2019

(86) PCT No.: PCT/EP2019/051577
§ 371 (c)(1),
(2) Date: Jul. 22, 2020

(87) PCT Pub. No.: WO2019/145334
PCT Pub. Date: Aug. 1, 2019

(65) Prior Publication Data
US 2021/0047849 A1    Feb. 18, 2021

(30) Foreign Application Priority Data
Jan. 23, 2018    (AT) .............................. A 50056/2018

(51) Int. Cl.
*F16L 3/00* (2006.01)
*E04G 21/04* (2006.01)
(Continued)

(52) U.S. Cl.
CPC ..... *E04G 21/0445* (2013.01); *E04G 21/0463* (2013.01); *F16B 2/18* (2013.01);
(Continued)

(58) Field of Classification Search
None
See application file for complete search history.

(56) References Cited

U.S. PATENT DOCUMENTS 5,640,996 A * 6/1997 Schlecht ................. B66C 13/40
137/615
5,823,218 A * 10/1998 Schlecht ............. E04G 21/0436
137/2
(Continued)

FOREIGN PATENT DOCUMENTS

CN    203947783 U    11/2014
DE    102009007310 A1    8/2010
(Continued)

*Primary Examiner* — Steven M Marsh
(74) *Attorney, Agent, or Firm* — Faegre Drinker Biddle & Reath LLP (57) ABSTRACT

A large manipulator includes an articulated boom that can be folded out. The articulated boom includes boom segments including a last boom segment having a boom tip. The articulated boom includes an end hose and end-hose holder. The end hose is flexible, arranged on the last boom segment, and can be removably coupled to the last boom segment by the end-hose holder. The end-hose holder includes a holding bracket arranged on the last boom segment. The holding bracket is configured to be pivotable into a first pivot position, a second pivot position, and a third pivot position relative to the last boom segment.

15 Claims, 9 Drawing Sheets

(51) Int. Cl.
*F16B 2/18* (2006.01)
*F16L 3/015* (2006.01)
(52) U.S. Cl.
CPC ............... *F16L 3/003* (2013.01); *F16L 3/015* (2013.01); *E04G 21/0436* (2013.01)

(56) References Cited

U.S. PATENT DOCUMENTS

| | | | | |
|---|---|---|---|---|
| 5,983,447 | A | * | 11/1999 | Boomgaarden ....... E01H 1/0836 15/340.1 |
| 8,281,811 | B2 | * | 10/2012 | Rau .......................... B66C 13/40 137/615 |
| 2005/0061548 | A1 | * | 3/2005 | Hooper ................... E21B 19/20 175/52 |
| 2017/0081154 | A1 | * | 3/2017 | Vierkotten .......... E04G 21/0436 |
| 2020/0392747 | A1 | * | 12/2020 | Henikl ................ E04G 21/0463 |

FOREIGN PATENT DOCUMENTS

| | | | |
|---|---|---|---|
| EP | 1852564 | A2 | 11/2007 |
| JP | S5740066 | A | 3/1982 |
| KR | 20140029845 | A | 3/2014 |

* cited by examiner

Fig. 1

LARGE MANIPULATOR WITH END-HOSE HOLDER

CROSS-REFERENCE TO RELATED APPLICATION

This application is a U.S. 371 Application of International Application No. PCT/EP2019/051577, filed 23 Jan. 2019, which claims priority to Austria Patent Application No. A50056/2018, filed 23 Jan. 2018, both of which are herein incorporated by reference in their entireties.

The invention relates to a large manipulator with an articulated boom which can be folded out and which has a plurality of boom segments, wherein the boom segments can be pivoted about respective articulation axes relative to an adjacent boom segment at articulation joints, wherein a flexible end hose is arranged on the last boom segment which forms the boom tip, wherein the end hose can be fixed to the last boom segment by means of an end-hose holder, wherein the end-hose holder comprises at least one holding bracket which is arranged on the last boom segment.

Such large manipulators have been available on the market for years. The holding of the end hose on the last boom segment is regularly achieved by holding brackets mounted in fixed manner on the boom segment. These holding brackets in some cases have a spring-assisted locking means which locks the end hose in the end-hose holder. Once this locking means has been manually released, the end hose can be lifted out of the holding brackets of the end-hose holder, or the end hose drops out of the holding brackets after release. The spring-assisted locking means in this case is designed such that the end hose, when the boom is folded in, is caught with the holding brackets of the end-hose holder by rotating the last boom segment and automatic locking takes place.

In particular with large manipulators with articulated booms, the boom segments of which are pivotable through large angles, the holding brackets of the end-hose holder which are mounted in fixed manner on the last boom segment interfere, since the end hose can be inadvertently caught and locked in the end-hose holder.

For this reason, an end-hose holder for the end hose is needed which on one hand secures the end hose during travel operation, but on the other hand during the concreting operation of the large manipulator makes largely unrestricted turning, in particular of the last boom segment, relative to the adjacent, penultimate boom segment possible. After the concreting operation, the end hose should be able to be caught and automatically locked with the end-hose holder.

The object of the invention is to devise an improved large manipulator which offers an end-hose holder which is simple to use. In particular, the end-hose holder should not interfere during deployment of the large manipulator and should reliably secure the end hose once deployment has ended.

This object is achieved by a large manipulator having the features of claim 1.

Due to the fact that the holding bracket is designed to be pivotable into at least three pivot positions relative to the last boom segment, wherein the holding bracket holds the end hose on the last boom segment in the first pivot position, the holding bracket releases the end hose in a direction of release in the second pivot position, and the holding bracket is folded onto the last boom segment in the third pivot position, a large manipulator can be provided which offers an end-hose holder which is simple to use and which does not interfere during deployment of the large manipulator and reliably secures the end hose once deployment has ended. With the holding bracket which is pivotable relative to the last boom segment, the end-hose holder can secure the end hose on the last boom segment in the first pivot position for travel operation. In the second pivot position, the pivotable holding bracket can release the end hose in the direction of release. With the third pivot position, the proposed holding bracket can in addition be folded onto the last boom segment, so that the holding bracket does not interfere during deployment. With such an end-hose holder, the last boom segment can be pivoted through large pivot angles relative to the adjacent boom segment without the folded-on holding bracket interfering with the movement of the end hose.

Advantageous configurations and developments of the invention will become apparent from the dependent claims. It should be pointed out that the features listed individually in the claims may also be combined with one another in any technologically sensible manner whatsoever and thus reveal further configurations of the invention.

According to one advantageous configuration of the invention, provision is made for the shape of the holding bracket to be adapted to the outer contour of the last boom segment such that the holding bracket in the third pivot position lies substantially over its entire longitudinal extent against the last boom segment. With a holding bracket which lies against said segment over the entire longitudinal extent in the third pivot position, the holding bracket can be folded onto the boom segment in a particularly space-saving manner. As a result, the folded-on holding bracket does not interfere during deployment.

An embodiment which provides that the at least one holding bracket is pivotable relative to the last boom segment in only one pivot axis is particularly advantageous. A holding bracket which is pivotable in only one pivot axis provides a simple way of combining the securing, release and folding-in of the holding bracket in one pivoting movement about an axis. This makes the design of the end-hose holder particularly simple and not susceptible to faults.

One particularly advantageous embodiment of the invention provides that an actuator brings about the pivoting of the at least one holding bracket relative to the last boom segment. With an actuator, the pivoting of the holding bracket can be controlled automatically or remotely controlled by the operator. Preferably the actuator is designed as a pneumatic cylinder.

It is particularly advantageous, in accordance with one configuration, that a spring brings about the pivoting of the at least one holding bracket relative to the last boom segment.

One advantageous embodiment is that the actuator brings about pivoting of the at least one holding bracket in a first pivoting direction and the spring force of the spring brings about pivoting of the at least one holding bracket in a second pivoting direction opposed to the first pivoting direction. With an actuator which pivots the holding bracket in the first pivoting direction counter to the spring force of a spring, which then brings about pivoting in the opposite pivoting direction, the position of the holding bracket can be set in simple manner. If the actuator fails, the spring continues to effect pivoting in the corresponding pivoting direction, so that the holding bracket is moved reliably in this pivoting direction. It is particularly advantageous if this pivoting direction leads to closing of the holding bracket around the end hose. Here, the end hose is then secured by the spring force of the spring should the actuator fail.

An embodiment in which provision is made that a pivot-position detection device detects the position of the at least one holding bracket relative to the last boom segment is particularly advantageous. With such a pivot-position detection device, the position of the holding bracket relative to the last boom segment can be reliably determined, which simplifies the actuation of the actuator on the holding bracket and the handling.

One particularly advantageous embodiment of the invention provides that the at least one holding bracket is three-dimensionally bent and forms at least one contact surface and at least one supporting surface for the end hose. With the three-dimensionally bent holding bracket which forms the supporting surface on which the end hose lies, and with a contact surface against which the end hose lies, the end hose can be reliably secured with the holding bracket. Depending on the position of the last boom segment, the supporting surface and the contact surface on the holding bracket can be formed by different regions on the holding bracket.

One advantageous embodiment is that the holding bracket is designed twice-angled, with a first portion starting from the pivot axis, a second portion adjoining the first portion and angled by 90° relative thereto, which second portion runs parallel to the pivot axis and forms the contact surface, and a third portion adjoining the second portion and in turn angled by 90° relative thereto, which third portion forms the supporting surface, wherein the third portion, relative to the plane formed by the first and the second portion, runs at an angle of other than 90°, preferably at an angle of <80°, particularly preferably of <70°. Due to this simple shaping, the holding bracket can perform its function in the three pivot positions. In the first pivot position, the end hose is surrounded on all sides by the last boom segment and the three portions of the holding bracket and thus held safely. In the second pivot position, the holding bracket is pivoted so far that the third portion runs substantially parallel to the last boom segment and consequently the end hose no longer lies on the supporting surface. As a result, the end hose is released in the direction parallel to the second portion of the holding bracket, i.e. perpendicularly to the last boom segment. The three portions which are angled in each case by 90° to each other form a substantially rectangular or square internal contour through which the last boom segment, which has a correspondingly rectangular or square cross-section, can extend in the third pivot position, so that the holding bracket in the folded-on state lies fully against the boom segment and does not interfere with boom movements.

An embodiment which provides that the articulated boom comprises a boom-position detection means which is designed to determine the position of the last boom segment, wherein a control device is provided which controls the releasing of the end hose from the end-hose holder dependent on the detected position of the last boom segment, is particularly advantageous. With release of the end hose dependent on the detected position of the last boom segment, accidents upon the releasing of the end hose and uncontrolled swinging-around of the end hose close to the ground can be avoided.

One advantageous embodiment is that the boom-position detection means comprises an inclination sensor on the last boom segment. With an inclination sensor on the last boom segment, the position of the last boom segment can be ascertained very simply.

It is particularly advantageous, in accordance with one configuration, that the at least one holding bracket can be locked against pivoting on the last boom segment. With the locking means of the holding bracket, the latter can be secured in the desired pivoting position.

An embodiment which provides that the pivoting of the at least one holding bracket on the last boom segment can be remote-controlled is particularly advantageous. The possibility of pivoting the holding bracket by remote control makes it possible to release or catch the end hose even at a great height and to secure it on the last boom segment.

It is particularly advantageous, in accordance with one configuration, that the end-hose holder comprises a plurality of holding brackets, wherein the holding brackets are connected by way of a transmission element and thereby jointly execute a pivoting movement about a respective pivot axis of the holding brackets. With a plurality of holding brackets on the end-hose holder, particularly long end hoses can be secured reliably on the last boom segment. Due to the joint pivoting movement of the holding brackets, merely one actuator and one spring can be used for pivoting a plurality of holding brackets.

One advantageous embodiment is that the transmission element is designed as a cable pull or rod. A cable pull or a rod represents a simple way of transmitting the transmission of the pivoting movement to the holding brackets of the end-hose holder.

Further features, details and advantages of the invention will become apparent on the basis of the following description and with reference to the drawings. Examples of embodiment of the invention are illustrated in the following drawings and will be described in greater detail below. Items which correspond to each other are provided with the same reference numerals in all the figures. These show:

FIG. 1 large manipulator according to the invention,
FIG. 2 articulated boom,
FIG. 3 last boom segment with secured end hose,
FIG. 4 last boom segment with released end hose,
FIG. 5 last boom segment close to the ground,
FIG. 6 holding bracket,
FIG. 7a, 7b 7c end-hose holder in first pivot position,
FIG. 8a, 8b, 8c end-hose holder in second pivot position,
FIG. 9a, 9b 9c end-hose holder in third pivot position,
FIG. 10 end-hose holder with actuator in first pivot position,
FIG. 11 end-hose holder with actuator in second pivot position,
FIG. 12 end-hose holder with actuator in third pivot position, and A large manipulator according to the invention is illustrated in FIG. 1, designated by the reference numeral 1. The large manipulator 1 shown in FIG. 1 is constructed in the manner of a truck-mounted concrete pump. The large manipulator 1 has a turntable 18, which is arranged to be rotatable about a vertical axis on the vehicle framework of the large manipulator 1. Set up on the turntable 18 there is shown an extended articulated boom 2. The four boom segments 3, 3a, 3b, 3c can be pivoted about respective articulation axes relative to the adjacent boom segment 3, 3a, 3b, 3c or the turntable 18 by way of articulation joints 4, 4a, 4b, 4c. To this end, hydraulic cylinders are arranged in each case between the turntable 18 and the first boom segment 3 and between the boom segments 3, 3a, 3b, which cylinders make pivoting of the boom segments 3, 3a, 3b relative to each other and of the first boom segment 3 relative to the turntable 18 possible by way of lever mechanisms. Between the last boom segment 3c which forms the boom tip 5 and the penultimate boom segment 3b there is arranged a rotary drive in the articulation joint 4c which makes infinite turning of the last boom segment 3c relative to the penultimate boom segment 3b possible. This rotary movement in the articulation joint 4c between the penultimate 3b and the last boom segment 3c is indicated by the circular arrow. It is precisely this rotary movement which creates new demands on the design of the end-hose holder 7 on the last boom segment 3c. The end-hose holder 7 formed on the last boom segment 3c should make it possible to fix the end hose 6 which is arranged on the last boom segment 3c. To this end, the end-hose holder 7 has two holding brackets 8, 8a. If these holding brackets 8, 8a were fastened rigidly to the last boom segment 3c, the holding brackets 8, 8a would inadvertently catch and fix the end hose 6 or simply restrict the rotary movement of the last boom segment 3c relative to the penultimate boom segment 3b. For this reason, it is proposed that the holding brackets 8, 8a be designed to be pivotable into three pivot positions relative to the last boom segment 3c. In a first pivot position, the holding brackets 8, 8a should secure the end hose 6 to the last boom segment 3c. A second pivot position of the holding brackets 8, 8a relative to the last boom segment 3c should effect release of the end hose 6. In a third pivot position, the holding bracket 8, 8a should be able to be folded onto the last boom segment 3c. This provides an end-hose holder 7, the holding brackets 8, 8a of which do not interfere with the indicated rotary movement of the last boom segment 3c relative to the penultimate boom segment 3b.

Figure 1:
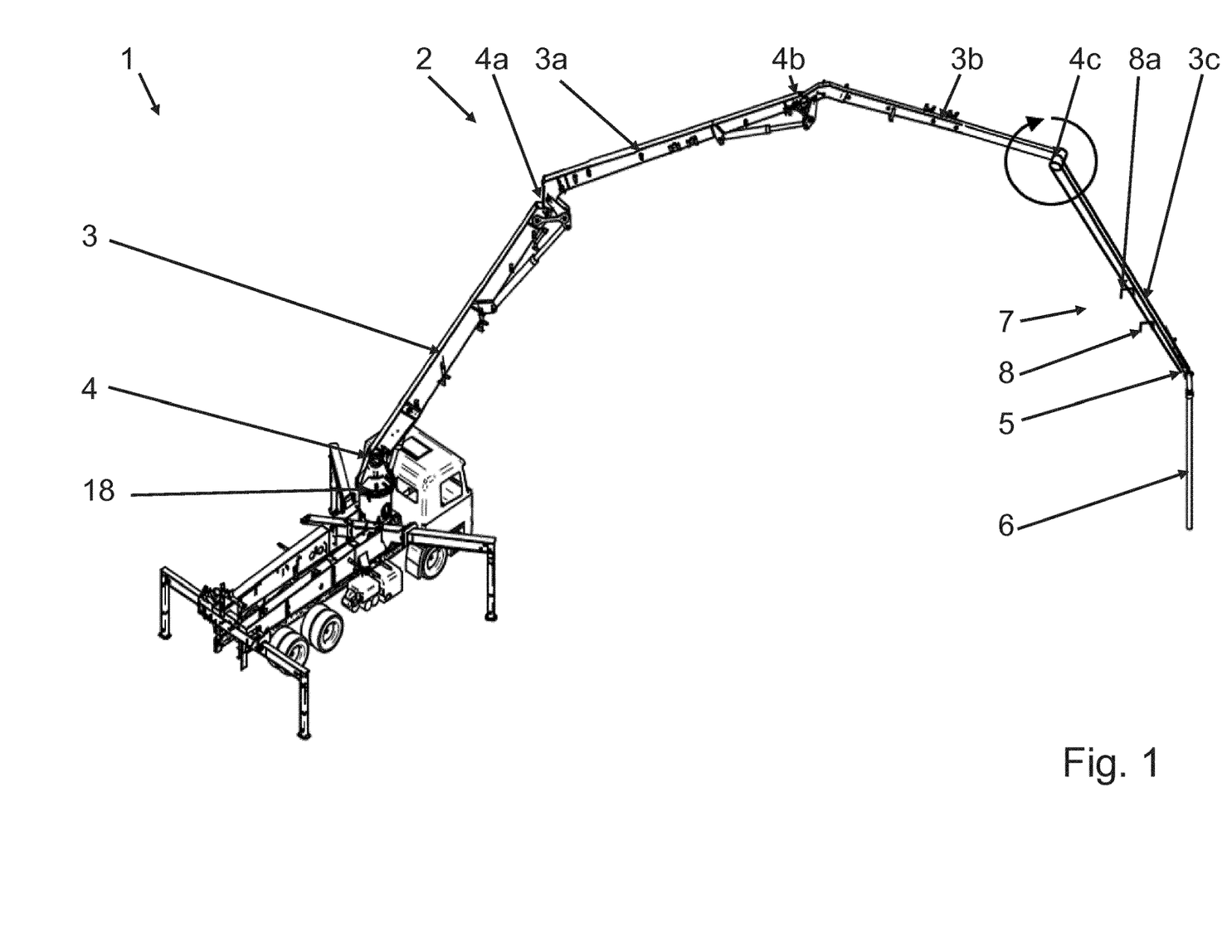
Figure 2:
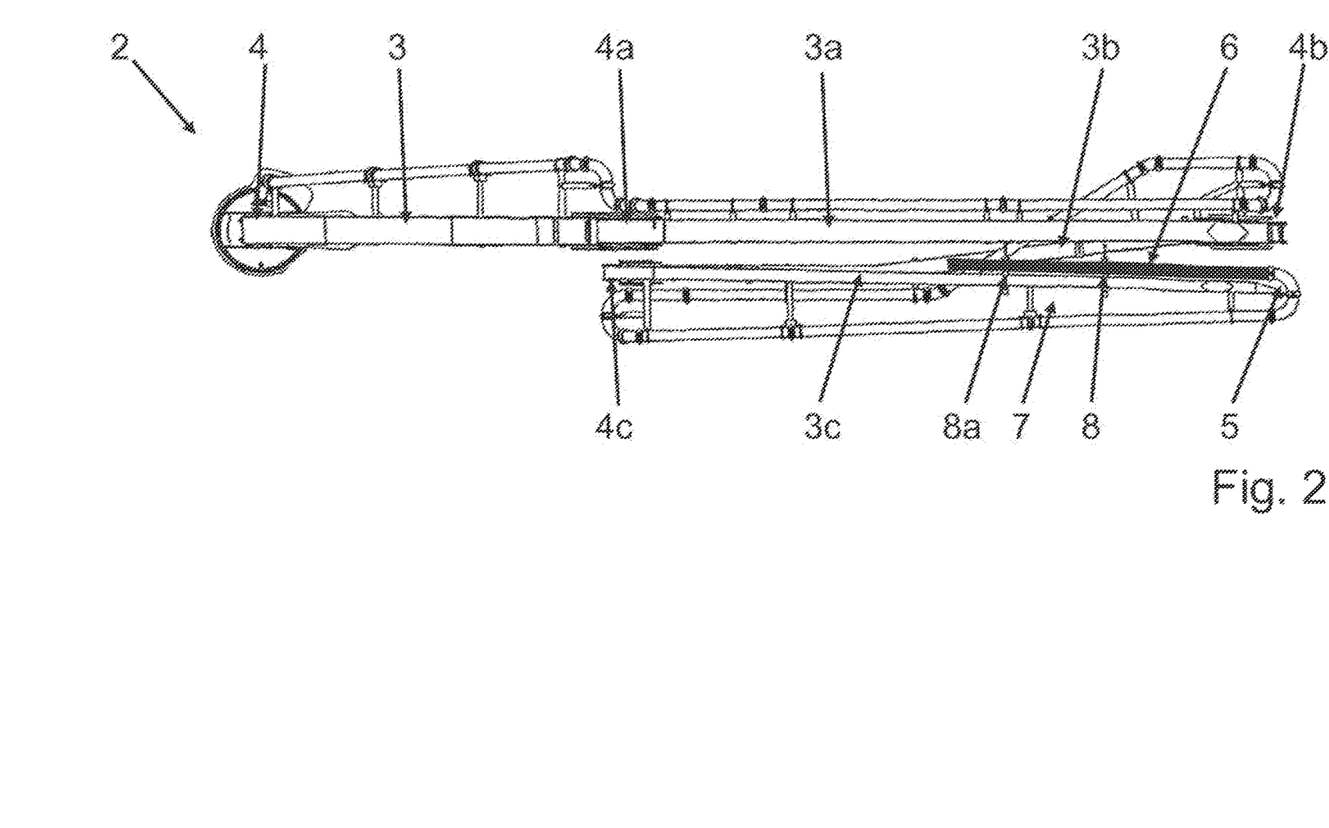

FIG. 2 shows an articulated boom 2 according to FIG. 1 in a partially folded-up state. The end hose 6 on the last boom segment 3c is here fixed by the end-hose holder 7 and secured on the last boom segment 3c. This is important in particular when the large manipulator 1 which is designed as a truck-mounted concrete pump (FIG. 1) is travelling, since road safety is increased due to the securing of the end hose 6 to the last boom segment 3c.

Figure 3:
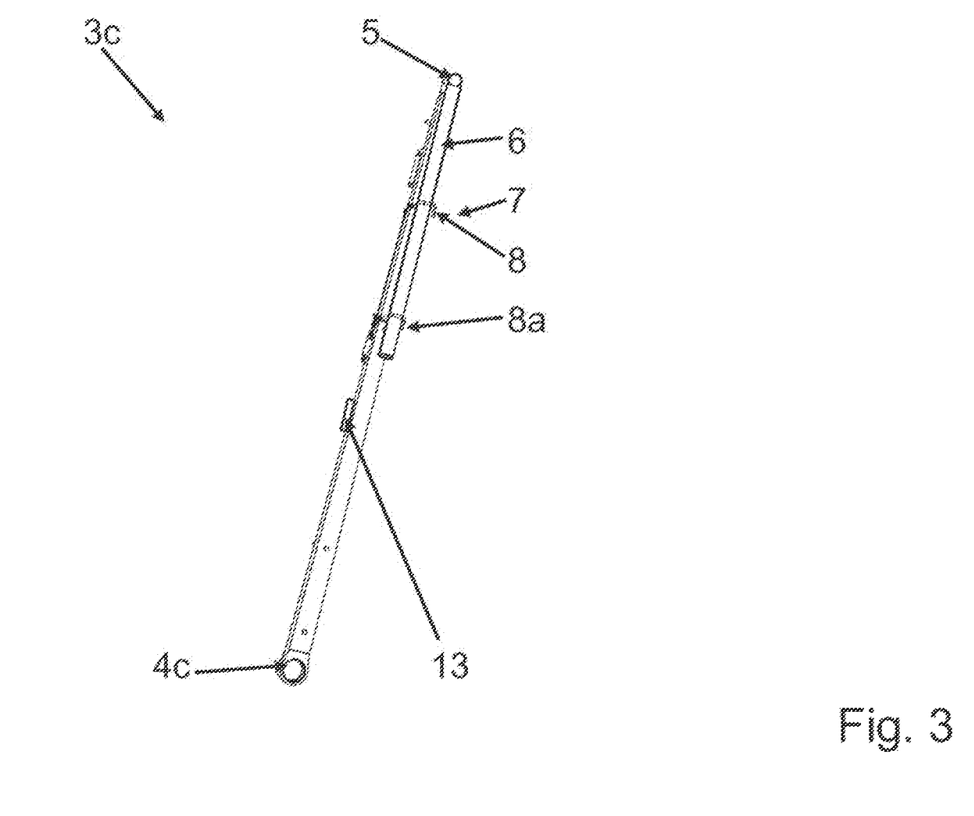

FIG. 3 shows the last boom segment 3c which forms the boom tip 5, and the flexible end hose 6 arranged thereon. The end hose 6 here is fixed to the last boom segment 3c by means of the end-hose holder 7. To this end, the holding brackets 8, 8a encompass the end hose 6 and fix it on the boom segment 3c.

Figure 4:
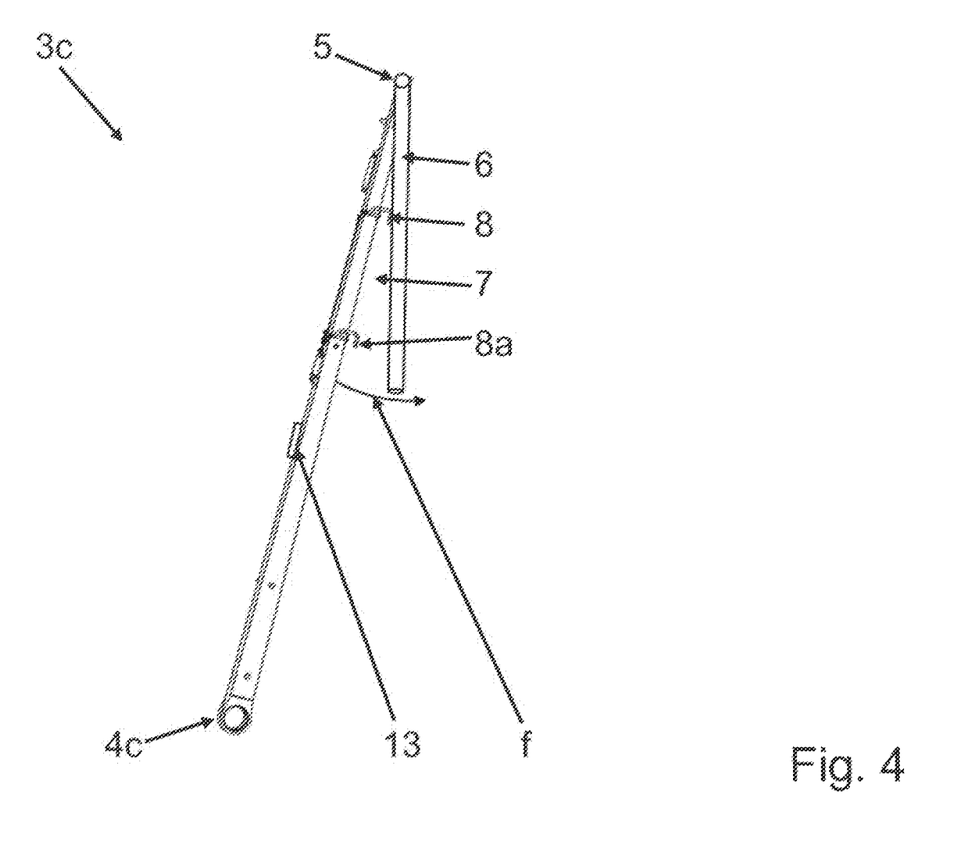

The last boom segment 3c according to FIG. 3 is apparent from FIG. 4. Here the end hose 6 is however released and pivoted in the direction of release f. The end hose 6 is preferably released by remote control, by the holding brackets 8, 8a being pivoted relative to the last boom segment 3c. In order to make safe handling possible when releasing the end hose 6 by remote control, the articulated boom 2 comprises a boom-position detection means 13 which is designed to determine the position of the last boom segment 3c. A control device is provided to control the release of the end hose 6 from the end-hose holder 7 dependent on the detected position of the last boom segment 3c. As a result, it can be ensured that the end hose 6 is not released close to the ground, which can lead to injuries. The position of the last boom segment 3c shown in FIG. 4 is suitable particularly for releasing the end hose 6, since the pivoting movement of the end hose 6 in the direction of release f is only limited here.

Figure 5:
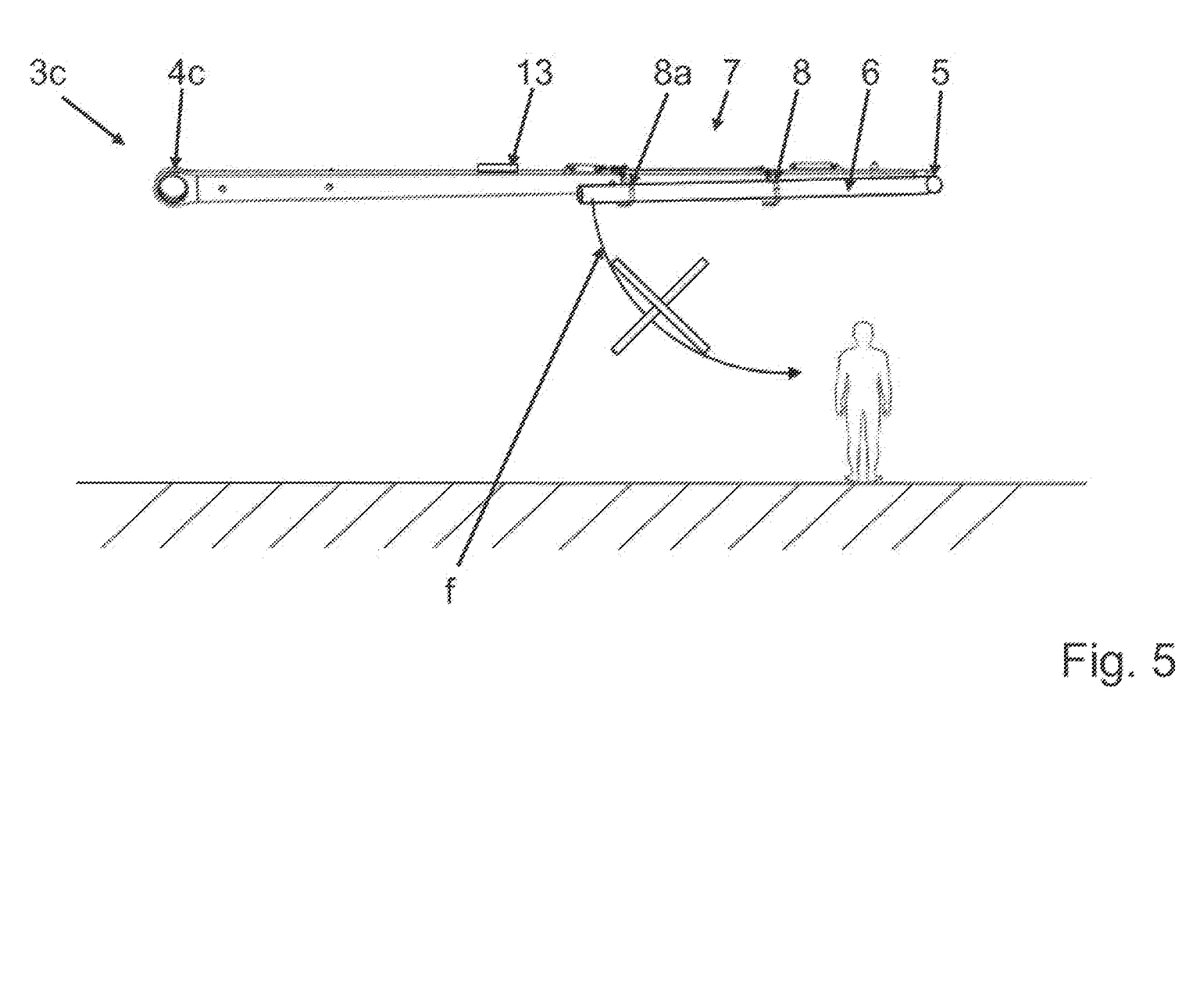

On this point, reference should also be made to FIG. 5, which indicates that the flexible end hose 6 arranged on the last boom segment 3c in certain positions of the last boom segment 3c close to the ground represents a risk to people in the vicinity, since they may be struck by the released end hose 6. The boom-position detection device 13 in a particularly simple case comprises an inclination sensor, by way of the signals of which the position of the last boom segment 3c can be determined. In order to secure against uncontrolled release of the end hose 6, the holding brackets 8, 8a may be manually locked and unlocked against pivoting on the last boom segment 3c.

Figure 6:
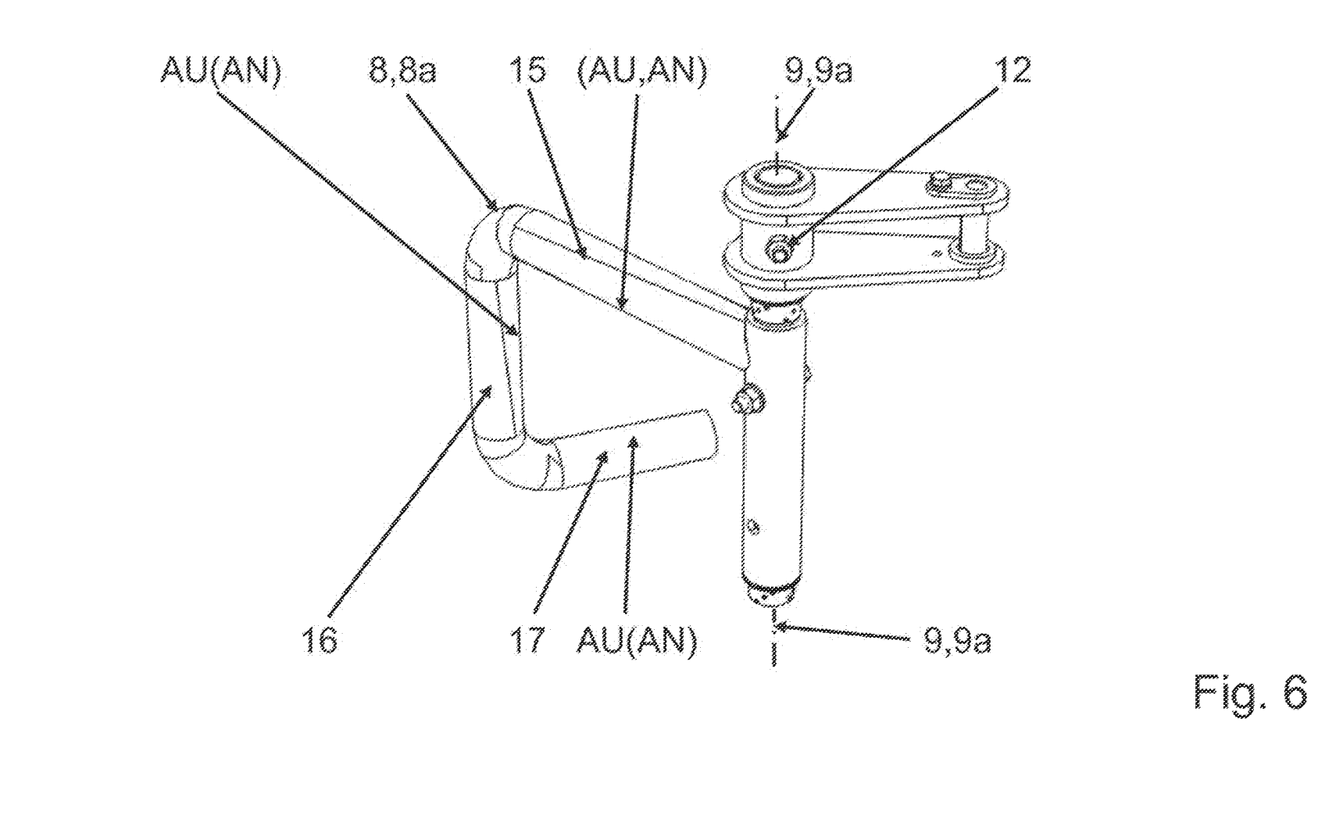

FIG. 6 shows a perspective view of a holding bracket 8, 8a of the end-hose holder 7 (FIG. 1). It can be recognized in this representation that the form of the holding bracket 8, 8a is adapted to the outer contour of the last boom segment 3c (FIG. 3), namely such that the holding bracket 8, 8a in the third pivot position substantially over its entire extent lies against the last boom segment 3c. This can be recognized particularly clearly in FIGS. 9a to 9c. The holding bracket 8, 8a forms a supporting surface AU for the end hose 6 (FIG. 5) on which the end hose 6 (FIG. 7c) lies, and additionally at least one contact surface AN is formed against which the end hose 6 (FIG. 7c) lies when lying on the supporting surface AU (FIG. 7c). The holding bracket 8, 8a is pivotable relative to the last boom segment 3c in only one indicated pivot axis 9, 9a (FIG. 7b). This makes the pivoting of the holding bracket 8, 8a by means of actuator 10 (FIGS. 10-13) possible in a particularly simple manner. Furthermore, as a result a simple design for the pivotable holding bracket 8, 8a which is not susceptible to faults is provided. As can further be recognized, the holding bracket 8, 8a is designed twice-angled. A first portion 15 of the holding bracket 8, 8a starts from the pivot axis 9, 9a. Adjoining the first portion 15 there is a second portion 16 angled by 90° which runs parallel to the pivot axis 9, 9a. Adjoining this second portion 16 there is in turn a third portion 17 angled by 90°, which, relative to the plane formed by the first 15 and the second portion 16, runs at an angle other than 90°. Preferably, this angle should be less than 80°, particularly preferably less than 70°. The holding bracket 8, 8a forms substantially a rectangular internal contour through which the correspondingly shaped boom segment 3c extends in the third pivot position. This can be seen in particular in FIGS. 9a to 9c.

Figure 7A:
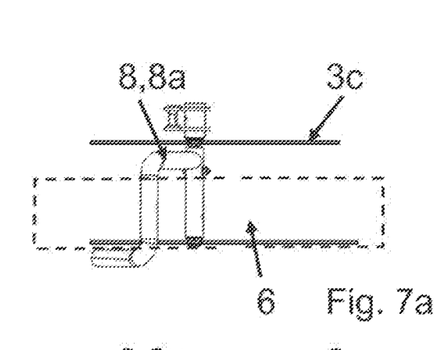
Figures 7B, 7C:
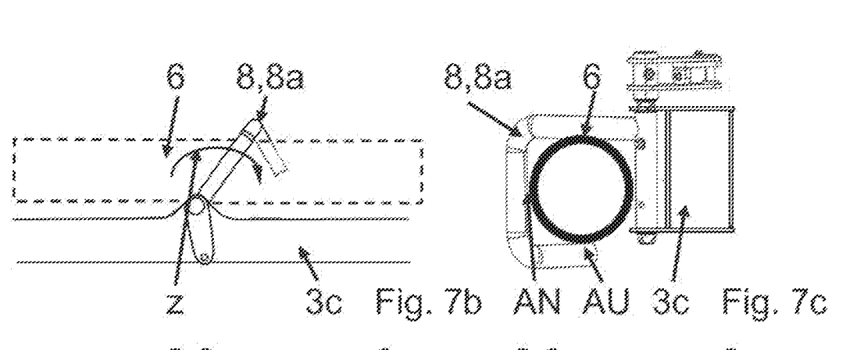

In FIGS. 7a to 7c, the holding bracket 8 of the end-hose holder 7 (FIG. 1) is shown in the first pivot position. In this position, the holding bracket 8, 8a holds the end hose 6 on the boom segment 3c. In the position of the boom segment 3c shown in FIG. 7c, the third, lower, portion 17 (FIG. 6) of the holding bracket 8, 8a forms the supporting surface AU for the end hose 6. The second, vertical, portion 16 (FIG. 6) in turn in the position of the last boom segment 3c which is shown forms the contact surface AN by which the end hose 6 is held in position.

Figure 8A:
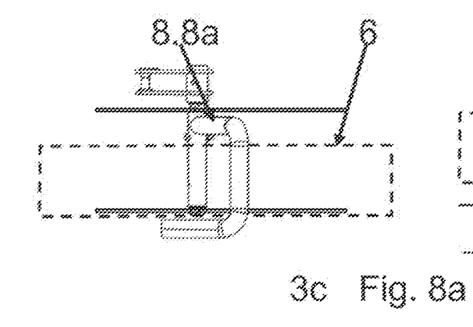
Figures 8B, 8C:
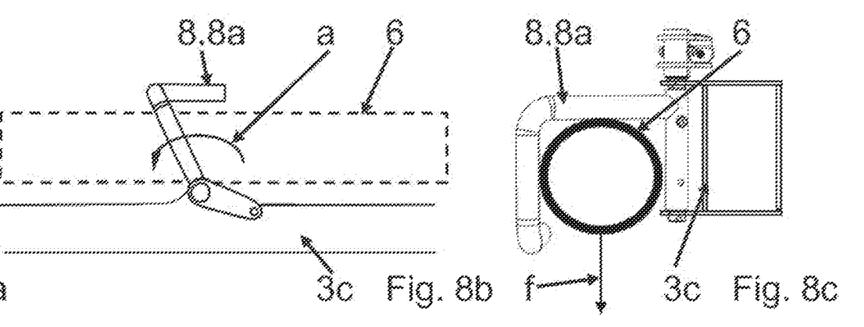

FIGS. 8a to 8c show the holding bracket 8, 8a of the end-hose holder 7 (FIG. 1) in the second pivot position. Here, the holding bracket 8, 8a is pivoted in a first pivoting direction a about the pivot axis 9, 9a (FIG. 6), so that the end hose 6 is released in the direction of release f. In this position of the holding bracket 8, 8a, the end hose 6 arranged on the last boom segment 3c can slip or drop out of the end-hose holder 7 in the direction of release f.

Figure 9B:
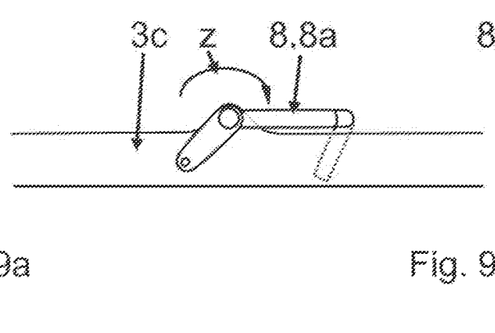
Figure 9C:
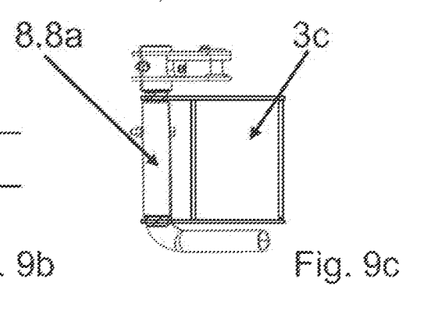

FIGS. 9a to 9c show the third pivot position of the holding bracket 8, 8a on the last boom segment. Here, the holding bracket 8, 8a is pivoted counter to the pivoting direction a in the pivoting direction z, so that the holding bracket 8, 8a is folded onto the last boom segment 3c. The shape of the holding bracket 8, 8a is adapted to the outer contour of the boom segment 3c such that the holding bracket 8, 8a in the pivot position shown lies substantially over its entire longitudinal extent against the boom segment 3c.

Figure 10:
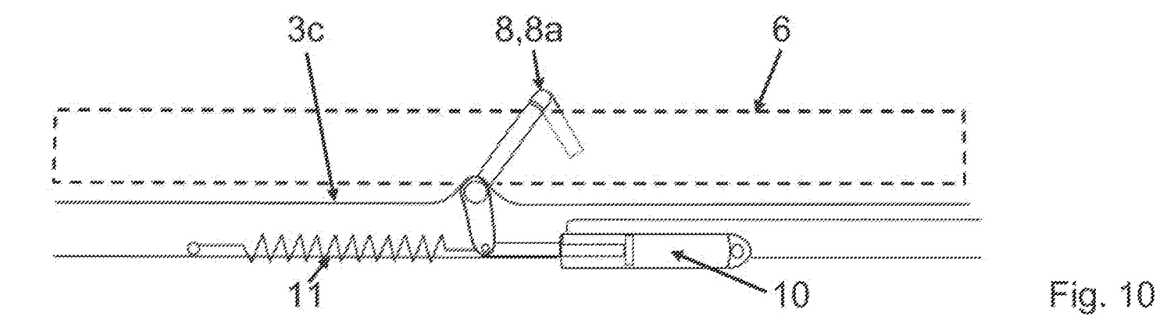

FIG. 10 shows a holding bracket 8, 8a which is pivotable by way of an actuator 10 relative to the boom segment 3c. The holding bracket 8, 8a here is in the first pivot position, so that the holding bracket 8, 8a fixes the end hose 6 on the last boom segment 3c. Whereas the actuator 10 brings about pivoting of the holding bracket 8, 8a in a first pivoting direction a, a spring 11 brings about pivoting of the holding bracket 8, 8a in a second pivoting direction z opposed to the first pivoting direction a. Owing to the fact that the spring 11 works against the actuator 10, should the actuator 10 fail or not be actuated securing of the end hose 6 on the boom segment 3c can be ensured. In the first pivot position, the spring 11 presses the holding bracket 8, 8a against the end hose 6, since the actuator 10, which is designed as a compressed-air cylinder, is unpressurised.

Figure 11:
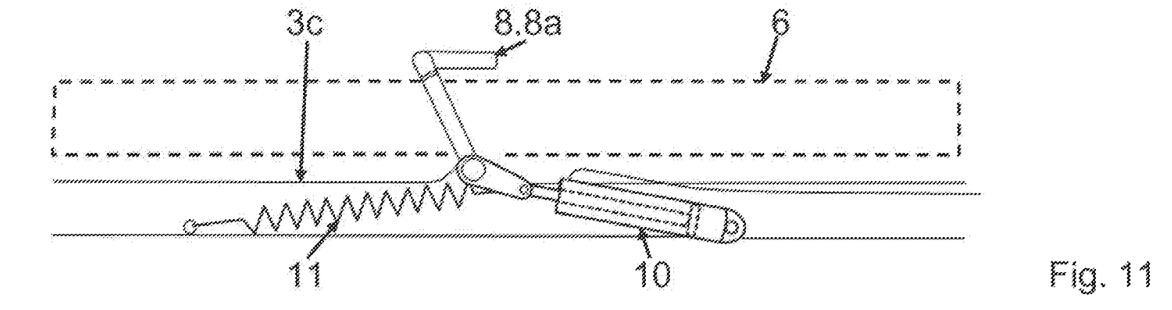

FIG. 11 shows the holding bracket 8, 8a of FIG. 10 in the second pivot position. Here, the end hose 6 is released and can slip out of the end-hose holder 7 (FIG. 1) in the direction of release f (FIG. 8c). The pivoting of the holding bracket 8, 8a is effected here by the actuator 10, which works counter to the spring 11. In the second pivot position, the spring 11 is tensioned, since the actuator 10, which is designed as a compressed-air cylinder, is actuated. The second pivot position makes it possible to receive and release the end hose 6.

Figure 12:
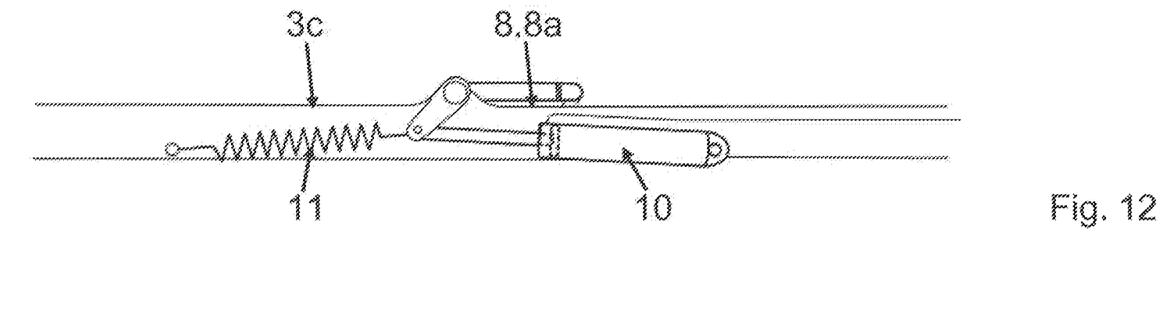

FIG. 12 shows the holding bracket of FIGS. 10 and 11 in the third pivot position, in which the holding bracket 8, 8a lies against the boom segment 3c. In this pivot position, the holding bracket 8, 8a is pivoted by the spring 11, since the actuator 10, which is designed as a pneumatic cylinder, is depressurized. In the third pivot position, the spring 11 presses the holding bracket 8, 8a against the boom segment 3c, so that the end hose can pivot past the holding bracket. In this position, the actuator 10, which is designed as a compressed-air cylinder, is unpressurised.

The actuator 10 and the spring 11 may also be designed as one unit, that is to say that the return spring 11 for returning into the actuator 10 is designed as a tension or compression spring depending on the mounting side, and ensures that in the unpressurised state of the actuator 11 the holding bracket 8 holds the end hose 6 safely in its position or pivots the holding bracket 8 onto the boom 3c.

Figure 13:
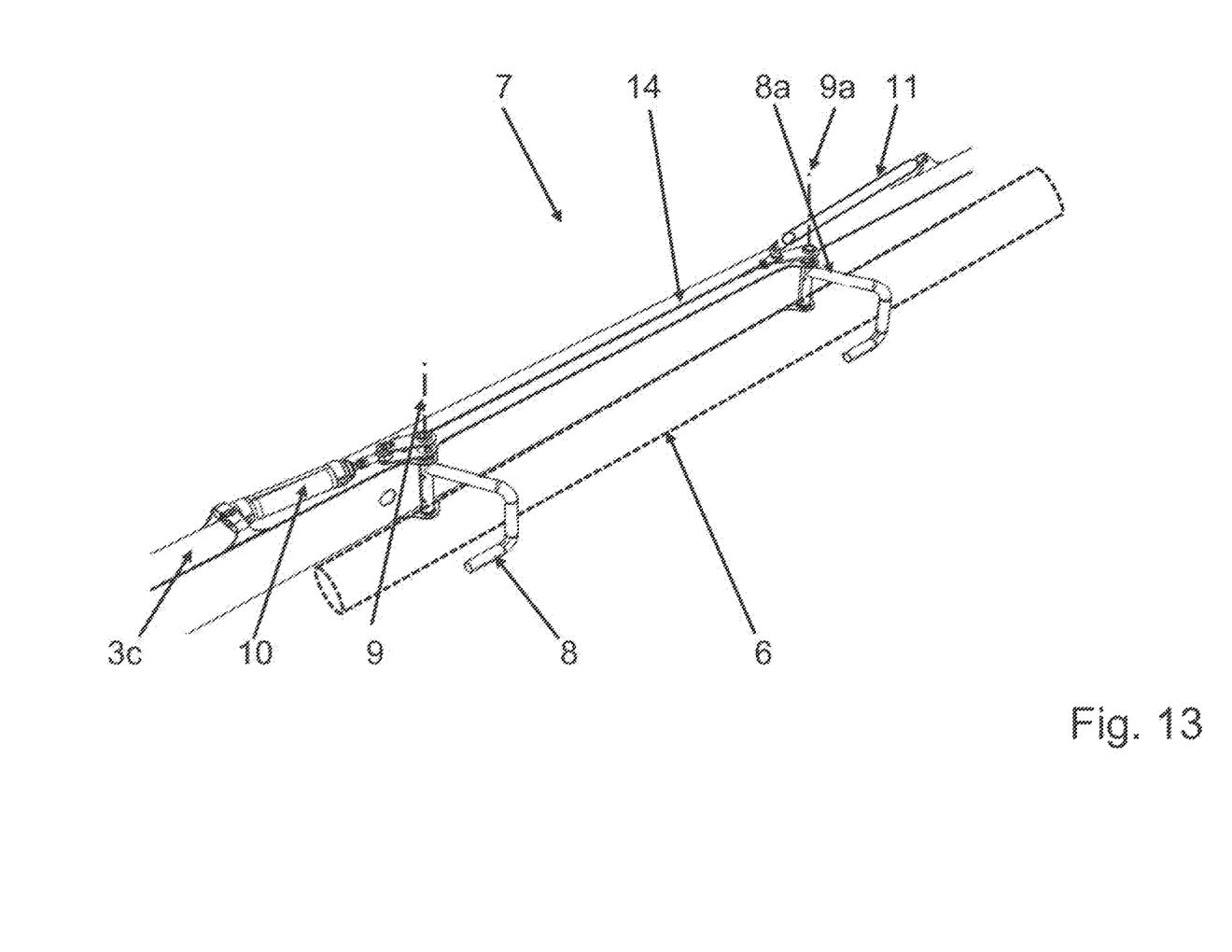

FIG. 13 shows an end-hose holder with two holding brackets 8, 8a. These two holding brackets 8, 8a are connected together by way of a transmission element 14, so that the pivoting movements by the actuator 10 and the spring 11 which are effected are the same for both holding brackets 8, 8a. The transmission element 14 in the example shown here is designed as a cable pull. If as indicated above the actuator 10 and the spring 11 form a structural unit, the transmission element 14 is expediently a linkage which permits transmission of thrust.

LIST OF REFERENCE NUMERALS 1 large manipulator
2 articulated boom
3a 3b 3c boom segment
4a 4b 4c articulation joint
5 boom tip
6 end hose
7 end-hose holder
8a holding bracket
9a pivot axis
10 actuator
11 spring
12 screw connection
13 boom-position detection means
14 transmission element
15 first portion (holding bracket)
16 second portion (holding bracket)
17 third portion (holding bracket)
18 turntable
a first pivoting direction
f direction of release
z second pivoting direction
AN contact surface
AU supporting surface

The invention claimed is:

1. A large manipulator comprising:
a vehicle frame;
a turntable coupled to the vehicle frame and rotatable about a vertical axis; and
an articulated boom coupled to the turntable and which can be folded out and which includes:
a plurality of boom segments including a last boom segment having a boom tip, wherein the boom segments can be pivoted about respective articulation axes relative to an adjacent boom segment at articulation joints,
an end hose that is flexible and that is arranged on the last boom segment, wherein the end hose is removably coupled to the last boom segment by an end-hose holder, and
the end-hose holder including a holding bracket arranged on the last boom segment, the holding bracket is configured to be pivotable into a first pivot position, a second pivot position, and a third pivot position relative to the last boom segment, wherein
in the first pivot position, the end hose is held by the holding bracket onto the last boom segment during travel,
in the second pivot position, the end hose is able to be released in a direction of release by the holding bracket, and
in the third pivot position, the holding bracket is configured to be folded onto the last boom segment,
wherein the holding bracket includes:
a first portion starting from a pivot axis,
a second portion adjoining the first portion and angled relative thereto, the second portion extends parallel to the pivot axis and forms a contact surface, and
a third portion adjoining the second portion and in turn angled relative thereto, the third portion forms a supporting surface, wherein the third portion, relative to a plane formed by the first and the second portion, extends at an angle thereto.

2. The large manipulator of claim 1, wherein a shape of the holding bracket is adapted to an outer contour of the last boom segment such that the holding bracket in the third pivot position lies substantially over its entire longitudinal extent against the last boom segment.

3. The large manipulator of claim 1, wherein the holding bracket is pivotable relative to the last boom segment in only one pivot axis.

4. The large manipulator of claim 1, further comprising:
an actuator configured to pivot the holding bracket relative to the last boom segment.

5. The large manipulator of claim 4, further comprising:
a spring configured to pivot the holding bracket relative to the last boom segment.

6. The large manipulator of claim 5, wherein the actuator is configured to pivot the holding bracket in a first pivoting direction, and wherein the spring is configured to pivot the holding bracket in a second pivoting direction opposite to the first pivoting direction.

7. The large manipulator of claim 1, wherein the holding bracket is three-dimensionally bent and forms a contact surface and a supporting surface for the end hose.

8. The large manipulator of claim 7, wherein the
second portion adjoining the first portion is angled by 90° relative thereto, and wherein the
third portion adjoining the second portion is angled by 90° relative thereto, wherein the angle is <70°.

9. The large manipulator of claim 1, wherein the holding bracket has a substantially rectangular or substantially square internal contour through which the last boom segment, which has a correspondingly substantially rectangular or substantially square cross-section, extends in the third pivot position.

10. The large manipulator of claim 1, further comprising: a control device, wherein the articulated boom comprises a position sensor configured to determine a position of the last boom segment, wherein the control device is configured to control releasing of the end hose from the end-hose holder based, at least in part, on a detected position of the last boom segment.

11. The large manipulator of claim 10, wherein the position sensor includes an inclination sensor arranged on the last boom segment.

12. The large manipulator of claim 1, wherein the holding bracket is able to be locked from pivoting on the last boom segment.

13. The large manipulator of claim 12, wherein pivoting of the holding bracket on the last boom segment is remote-controlled.

14. The large manipulator of claim 13, wherein the end-hose holder comprises holding brackets, wherein the holding brackets are connected via a transmission element and are arranged to jointly execute a pivoting movement about a respective pivot axis of the holding brackets.

15. The large manipulator of claim 14, wherein the transmission element is a cable pull or rod.

* * * * *